United States Patent [19]
Divecha et al.

[11] Patent Number: 6,016,785
[45] Date of Patent: Jan. 25, 2000

[54] PRE-COMBUSTION CHAMBER ASSEMBLY AND METHOD

[75] Inventors: Devang D. Divecha, Lafayette, Ind.; Ronald T. Taylor, Morton, Ill.; Carl W. Ferree, Lafayette, Ind.

[73] Assignee: Caterpillar Inc., Peoria, Ill.

[21] Appl. No.: 09/164,888

[22] Filed: Oct. 1, 1998

[51] Int. Cl.[7] .................................................. F02B 19/00
[52] U.S. Cl. .................................... 123/254; 29/888.01
[58] Field of Search .................................. 123/254, 256, 123/266, 267, 268; 29/888.01

[56] References Cited

U.S. PATENT DOCUMENTS

| | | | |
|---|---|---|---|
| 4,006,725 | 2/1977 | Baczek et al. | 123/267 |
| 4,892,070 | 1/1990 | Kuhnert | 123/274 |
| 5,222,993 | 6/1993 | Crane | 123/256 |
| 5,431,140 | 7/1995 | Faulkner | 123/254 |
| 5,554,908 | 9/1996 | Kuhnert et al. | 313/140 |
| 5,609,130 | 3/1997 | Neumann | 123/267 |
| 5,662,082 | 9/1997 | Black et al. | 123/254 |

FOREIGN PATENT DOCUMENTS 10-47096  7/1996  Japan .............................. F02D 19/02

Primary Examiner—Willis R. Wolfe
Assistant Examiner—Hieu T. Vo
Attorney, Agent, or Firm—Alan J. Hickman

[57] ABSTRACT

A pre-combustion chamber assembly and method for an internal combustion engine consists of first, second and third body portions of different metallic materials. A second end of the first body portion is joined to the first end of the second body portion by brazing and the first end of the third body portion is joined to the second end of the second body portion by controlled depth penetration welding. The first, second and third body portions are pre-machined. The first and second body portions are connected to form a first subassembly and the third body portion is subsequently connected to the first subassembly.

20 Claims, 3 Drawing Sheets

Fig. - 1 -
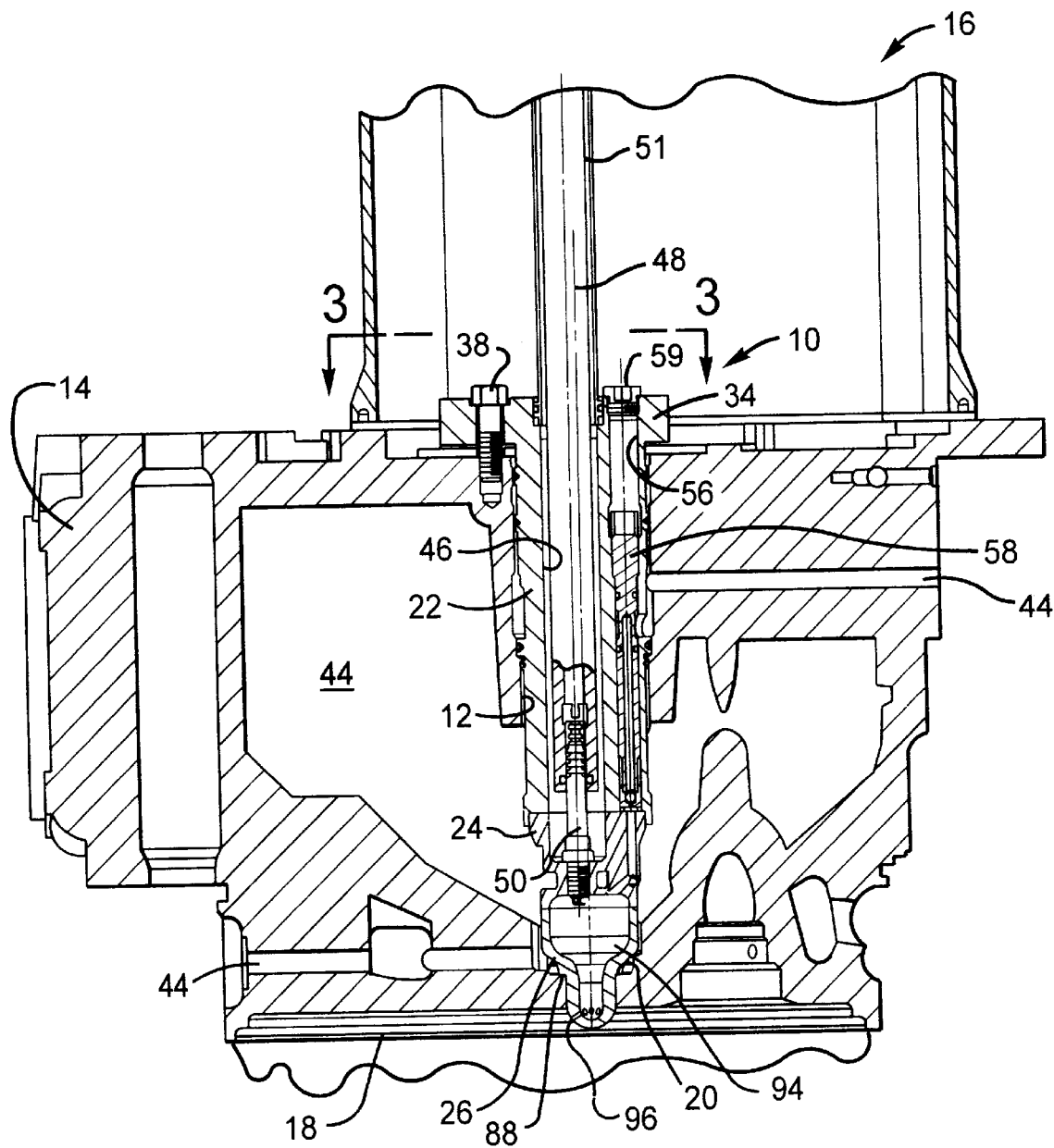

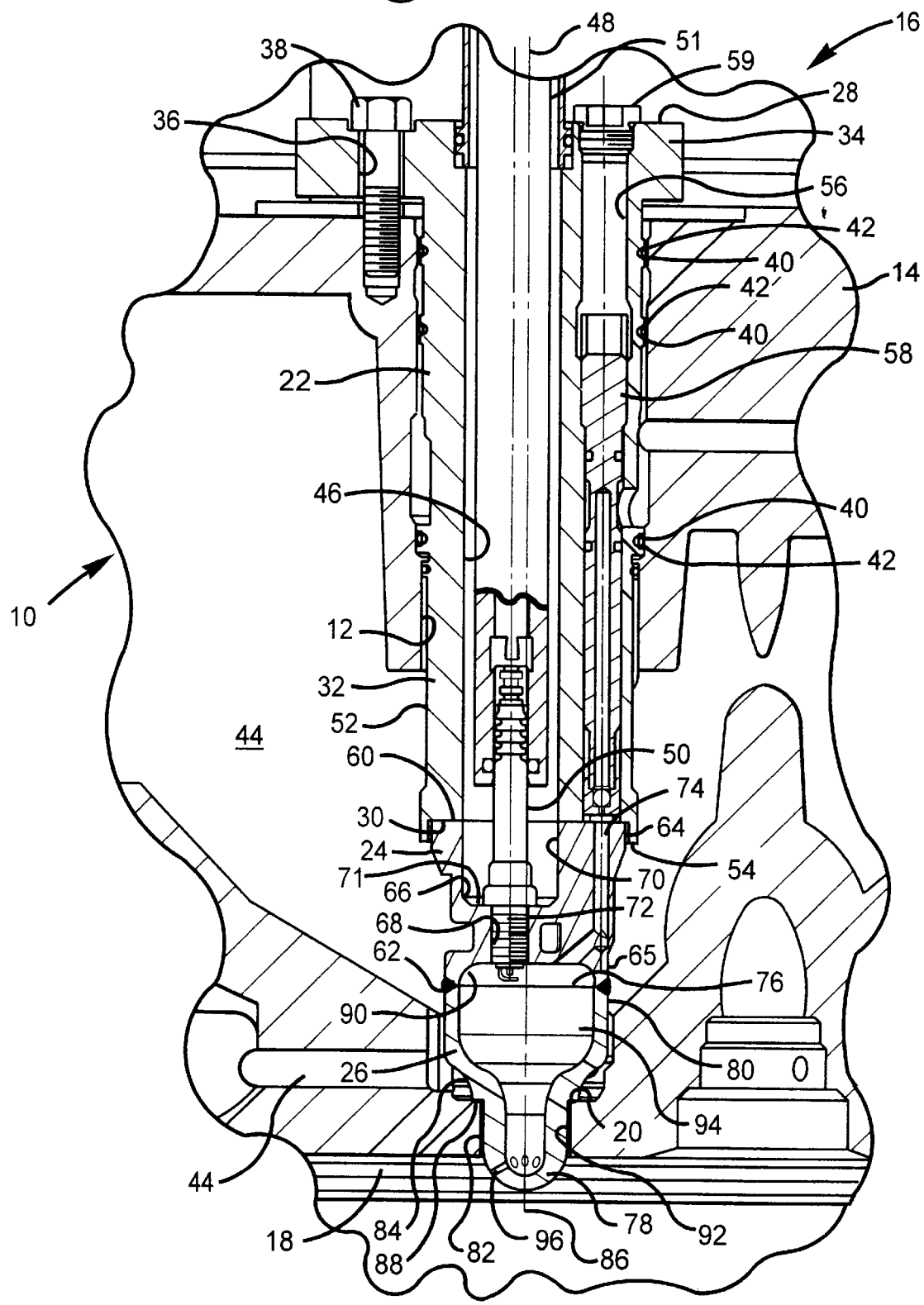
Fig. -2-

Fig. - 3 -
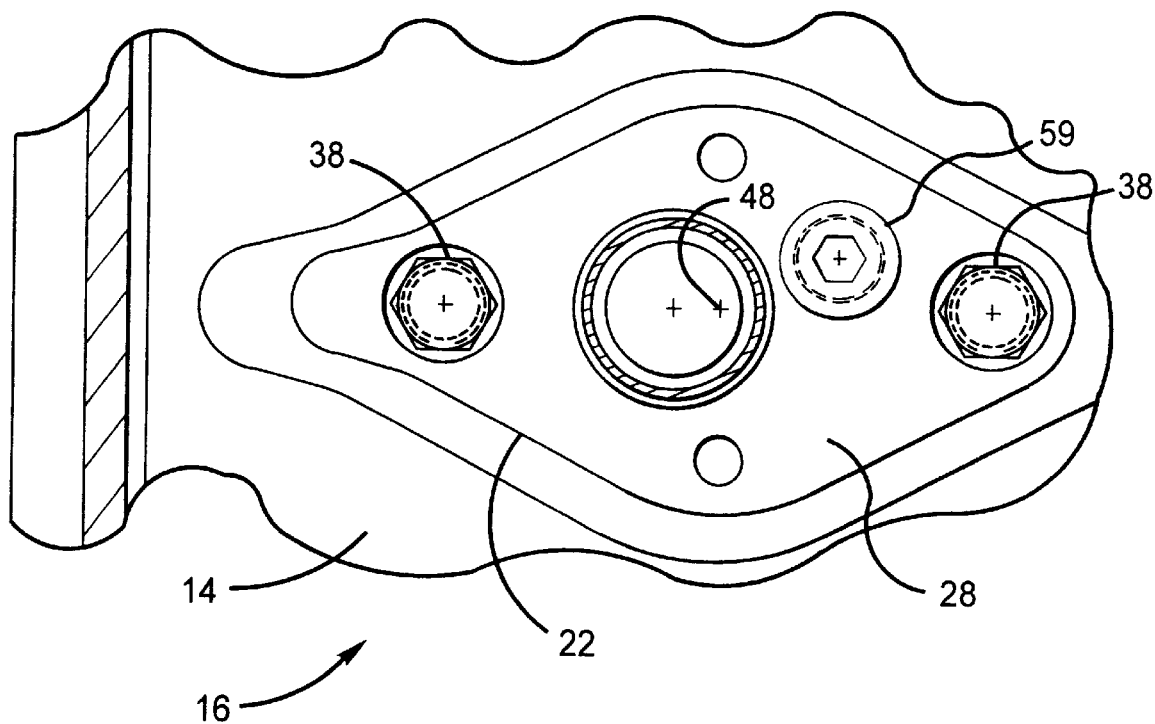

PRE-COMBUSTION CHAMBER ASSEMBLY AND METHOD

TECHNICAL FIELD

This invention relates to a pre-combustion chamber assembly and method of assembly and more particularly to a pre-combustion assembly having first, second and third body portions connected together.

BACKGROUND ART

Pre-combustion chambers have been in use in combustion chambers of internal combustion engines know for quite some time. Such pre-combustion chambers are particularly useful in gas fueled internal combustion engines. In such applications, it is necessary to ignite the fuel with an ignition device, such as a sparkplug, as the c-tane number is too low to accommodate compression ignition. Pre-combustion chambers assist in complete combustion and reduce undesirable engine emissions.

Typically, pre-combustion chambers are made from a material that is capable of withstanding the worst operating conditions, temperature, chemical reaction, mechanical loading and the like. Such a pre-combustion chamber is acceptable from an operating standpoint. However, the use of rare materials and the cost associated therewith is difficult to justify.

It would be beneficial to utilize less exotic, lower cost materials to make a pre-combustion chamber, however, the life of such a pre-combustion chamber is undesirably short and results in frequent replacement. This replacement is time consuming and costly. It is desirable to provide a pre-combustion chamber that has a long life and is constructed for less costly materials.

The present invention is directed at overcoming one or more of the problems set forth above.

DISCLOSURE OF THE INVENTION

In one aspect of the present invention, a pre-combustion chamber assembly for an internal combustion engine having a first body portion with first and second spaced ends and a sparkplug receiving bore disposed in the first body and opening at said first and second ends is provided. The sparkplug receiving bore is adapted to receive a sparkplug. The pre-combustion chamber also has a second body portion with first and second spaced ends and a stepped bore disposed in and opening at the first and second ends of the second body portion. The stepped bore has a threaded bore portion. The threaded bore portion is adapted to screwthreadably receive a sparkplug therein. The pre-combustion chamber assembly also has a third body portion with a first end, a dome end portion spaced from said first end, and a pre-combustion chamber disposed in and opening at the first end of said third body. The dome end has a plurality of spaced apart orifices disposed therethrough which open into the pre-combustion chamber. The second end of the first body portion is connected to the first end of the second body portion by a brazing material and the second end of the second body portion is connected to the first end of the third body portion by a controlled depth penetration weld process.

In another aspect of the present invention, a pre-combustion chamber assembly for an internal combustion engine has a first body portion having first and second spaced ends and a sparkplug receiving bore disposed therethrough and opening at the first and second ends. The sparkplug receiving bore is adapted to receive a sparkplug therein. The pre-combustion chamber assembly also has a second body portion having first and second spaced ends and a stepped bore disposed in and opening at the first and second ends of the second body portion. The second body portion has a threaded bore portion disposed internally in the stepped bore. The threaded bore portion is adapted to screwthreadably receive a sparkplug. The pre-combustion chamber assembly also has a third body portion having a first end, a dome end portion spaced from said first end, and a pre-combustion chamber disposed in and opening at the first end of said third body. The dome end has a plurality of spaced apart orifices disposed therethrough which opens into the pre-combustion chamber. The first, second and third body portions are each of a different metallic material. The second end of the first body portion is connected to the first end of the second body portion and the second end of the second body portion is connected to the first end of the third body portion.

In yet another aspect of the present invention, a method of assembling a pre-combustion chamber assembly having first, second and third body portions of different metallic materials, comprises the steps of: machining a sparkplug receiving bore, a second end portion, a collar portion, and an outer cylindrical surface of the first body portion to finished dimensions; machining a first end, a second end, a cylindrical first end portion and a stepped bore having a threaded bore portion of a second body portion to finished dimensions; machining a first end, a combustion chamber, and plurality of spaced apart orifices in a dome end portion of a combustion chamber to finished dimensions; maintaining the second end of the first body and the first end of the second body in abutment with each other and the sparkplug receiving bore and the stepped bore in substantially axial alignment with each other; and brazing the first and second body portions together to form a first sub-assembly.

BRIEF DESCRIPTION OF THE DRAWINGS

FIG. 1 is a diagrammatic cross-sectional view of an embodiment of a pre-combustion chamber assembly of the present invention shown installed in an internal combustion engine;

FIG. 2 is a diagrammatic cross-sectional view of the pre-combustion chamber assembly of FIG. 1 shown in greater detail; and FIG. 3 is a diagrammatic cross-sectional view of the pre-combustion chamber assembly taken along lines 3—3 of FIG. 1.

BEST MODE FOR CARRYING OUT THE INVENTION

With reference to the drawings, a pre-combustion chamber assembly 10 is shown disposed in a bore 12 in a cylinder head 14 of an internal combustion engine 16. The pre-combustion chamber assembly 10 and extends from the cylinder head 14 into a combustion chamber 18 of the internal combustion engine 16. A sealing surface 20 is provided in the cylinder head 14 to seal the combustion chamber 18 from cooling fluid disposed in cooling fluid passages 44 in the cylinder head 14.

As best seen in FIG. 2, the pre-combustion chamber 10 has a first body portion 22, a second body portion 24 and a third body portion 26. The first body portion 22 has first and second ends 28,30 and a cylindrical body portion 32 located between the first and second ends 28,30. A collar portion 54 having a tubular like configuration extends axially from the second end 30. A flange 34 is provided at the first end 28 of the first body portion 22. The flange 34 has an pair of aperture 36 disposed therethrough for receiving a threaded fastener 38. The threaded fasteners 38 are screwthreadably connected to the cylinder head 14. The threaded fasteners 38 retain the pre-combustion chamber assembly 10 in bore 12 in the cylinder head 14 and from rotary and axial movement relative to the bore 12.

The first body portion 22 also has a plurality of axially spaced apart annular grooves 40 disposed circumferentially about a cylindrical outer surface 52. The annular grooves 40 open radially outwardly and each receive an "O" ring seal 42. The "O" ring seals 42 each engage the cylinder head 14 at spaced apart axial locations in the bore 12 and seals the various cooling fluid passages 44 from fluid leakage thereby. The seals 42 are made of any suitable non-metallic "O" ring sealing material.

The first body portion 22 also has a sparkplug receiving bore 46 disposed therethrough and opening at the first and second ends 28,30 of the first body portion 22. The sparkplug receiving bore 46 is parallel to a longitudinal axis 48 of the first body 22 portion and radially offset therefrom. The sparkplug receiving bore 46 is of a diameter sufficient for receiving a sparkplug 50 having a sparkplug extender 51 and for permitting access to the sparkplug 50 for installation and removal purposes. The sparkplug 50 in the context of this invention means any suitable ignition device available in the art.

The first body portion 22 also has a check valve receiving bore 56 disposed therein. The check valve receiving bore 56 opens at the first and second ends 28,30 and is of a predetermined diameter sufficient to receive a check valve assembly 58 and a plug 59 at the first end 28. The check valve receiving bore 56 is substantially longitudinally parallel to the sparkplug receiving bore 46 and to the longitudinal central axis 48 of the first body portion 22. The first body portion 22 is preferably made of a ductile iron casting—pearlitic ferritic.

The second body portion 24 has a first end 60 and a second end 62, a first end portion 64 terminating at the first end 60 and a second end portion 65 terminating at the second end 62. The first and second end portions 64,65 are cylindrical. The first and second ends 60,62 are substantially parallel to each other and substantially perpendicular to the first end portion 64. The second body portion 24 is made of a stainless steel material capable of withstanding relatively high temperatures as compared to the lower temperature capabilities of the first body portion 22. Preferably a wrought stainless steel alloy, Type 347 is used. This alloy has excellent castability, weldability and is not hardenable through heat treatment. This material is particularly suitable for use between 800 and 1650 degrees Fahrenheit under stress, severe corrosion and vibration applications. The second body portion 24 is preferably cast to the general configuration and subsequently machined to final dimensions where required.

The second body portion 24 has a stepped bore 66 disposed therein. The stepped bore 66 opens at the first and second ends 60,62 and is adapted to receive the sparkplug 50. The stepped bore 66 has a threaded bore portion 68 and a counter-bore 70 portion. The threaded bore portion 68 screwthreadably receives the threaded end portion 72 of the sparkplug 50 and the counter-bore portion 70 is adapted to receive the sparkplug 50 with radial clearance. A sealing surface 71 is defined by a step located between the counter-bore portion 70 and the threaded bore portion 68. The sealing surface 71 is adapted to sealing engage the sparkplug 50. The counter-bore portion 70 and the threaded bore portion 68 are axially aligned. The second body portion 24 also has a fuel passing passageway 74 disposed therein and opening at the first and second ends 60,62. The fluid passing passageway 74 opens at the first end 60 of the second body portion 24 into the check valve receiving bore 56 and at the second end 30 of the first body portion 22.

The third body portion 26 has a first end 76 and a spherical dome end portion 78 spaced from the first end 76. The third body portion 26 has a cylindrical first end portion 80 a, cylindrical second end portion 82 and a transition portion 84 located between the first and second end portions 80,82. The transition portion 84 provides a gradual transition and blending between the different diameters of the first and second cylindrical end portions 80,82. The dome end portion 78 ends at and is tangent to the second end portion 82. The first and second end portions 80,82, the transition portion 84 and the dome end portion 78 are disposed about a central axis 86.

A sealing surface 88 is disposed about the third body portion 26 at a predetermined location axially along the transition portion 84 between the first end portion 80 and the dome end portion 78. The sealing surface 88 extends transversely relative to the central axis 86. The sealing surface 88 is provided to seal the leakage between the combustion chamber 18 and the cooling fluid passages 44. The sealing surface 88 engages the surface area 20 located adjacent a bore 92 disposed in the cylinder head 14. The bore 92 opens into the combustion chamber 18 and receives the second end portion 82. The bore 92 enables the dome end portion 78 to extend into and be exposed to the combustion chamber 18.

The third body portion 26 has a pre-combustion chamber 94 disposed therein. The pre-combustion chamber generally has the same shape as that of the third body portion 26 and opens at the first end 76 of the third body portion 26. As shown, a portion 90 of the pre-combustion chamber 94 is disposed in the second body portion 24 and opens at the second end 62 of the second body portion 24. A plurality of spaced apart radially oriented orifices 96 are disposed in the dome end portion 78. The orifices 96 open into the pre-combustion chamber 94 and into the combustion chamber 18 of the engine 16. The orifices direct the expanding gasses from the pre-combustion chamber 94 in a predetermined pattern into the combustion chamber 18.

The third body portion 26 is made from a high temperature material. In particular, a high temperature, thermally stable and environmentally resistant alloy, such as, Haynes 230, manufactured by Haynes International, Inc. of Kokomo Ind., is the desired choice. This alloy is a nickel-chromium-tungsten-molybdenum alloy that combines high temperature strength, resistance to oxidizing environments up to 2100 degrees F (1149 degrees centigrade), resistance to nitriding environments, and long term thermal stability. It is to be understood that other high temperature materials of suitable composition may be substituted without departing from the invention. The third body portion 26 may be cast or machined from bar stock.

The first body portion 22, the second body portion 24 and the third body portion 26 are connected together to form the pre-combustion chamber assembly 10. In particular, the second end 30 of the first body portion 22 is connected to the first end 60 of the second body portion 24 and the second end 62 of the second body portion 24 is connected to the first end 76 of the third body portion 26.

The second end 30 of the first body portion 22 is connected to the first end 60 of the second body portion 24 by a brazing material of a suitable composition capable of withstanding the environment (temperature, chemical and mechanical loading) in which it is exposed. For example, a silver-nickel braze material is suited for such an application. The collar portion 54 receives the cylindrical first end portion 64 of the second body portion 22 substantially co-axially therein. The collar portion 54 is radially spaced from the first end portion 64 of the second body portion 24 a preselected distance sufficient to receive the flowing braze material therebetween during the brazing process and to provide strength, rigidity and the required relative positioning of the first and second body portions 22,24. It should be noted that the sparkplug receiving bore 46 and the counterbore portion 70 are axially aligned and substantially the same diameter.

The second end 62 of the second body portion 24 abuts and is connected to the first end 76 of the third body portion 26 by a controlled depth penetration weld, for example a laser or electron beam weld, disposed about the pre-combustion chamber 10 at a juncture of contact between the first and second ends 76,62. A controlled dept penetration weld is utilized in order to accurately control the depth of penetration, maximize the depth of penetration, and provide adequate weld strength. The depth of penetration is between 4 to 4.5 millimeters at the juncture of contact. The wall thickness at this juncture is about 5 millimeters. The cylindrical second end portion 65 of the second body portion 24 and the cylindrical first end portion 80 of the third body portion 26 are substantially the same diameter and axially aligned.

A method of manufacturing the pre-combustion chamber assembly 10 includes the steps of pre-machining the first, second and third body portions 22,24 and 26. Maintaining, using a fixture of any suitable construction, the second end 30 of the first body portion 22 and the first end 60 of the second body portion 24 in abutment with each other, the sparkplug receiving bore 46 in axial alignment with the counter-bore 70, and the fluid passing passageway 74 in fluid passing communication with the check valve receiving bore 56. At this position the first and second body portions 22,24 are brazed together using the above mentioned brazing material to form a first sub-assembly.

Pre-machining of the first body portion 22 includes, but is not limited to, machining the sparkplug receiving bore 46, the check valve receiving bore 56, the second end 30, the collar portion 54, and the outer cylindrical surface 52 to finished dimensions. The collar portion 54 is machined to receive the first end portion 64 of the second body portion 24 and is radially spaced from the first end portion 64 the distance sufficient to receive the brazing material in between.

Pre-machining of the second body portion 24, includes but is not limited to, machining the first end 60, the cylindrical first end portion 64, the stepped bore 66, and the threaded bore portion 68 to finished dimensions. Pre-machining of the first subassembly includes machining a weld relief at the second end 62 of the second body portion 24.

Pre-machining of the third body portion 26, includes but is not limited to, machining the first end 76, the first end portion 80, the second end portion 82, the transition portion 84, the dome end portion 78, the pre-combustion chamber 94, and the plurality of orifices 96, to finished dimensions.

A fixture of any suitable design maintains the second end 62 of the second body portion 24 of the first subassembly in engagement with the first end 76 of the third body portion 26 and the orifices 96 of the third body portion 26 oriented in a preselected is direction relative to the flange 34 of the first body portion 34. The orientation of the orifices 96 relative to the flange 34 determines the positioning of the orifices 96 in the combustion chamber 18 so that the expanding gasses may be properly directed.

The second body portion 24 is connected by a controlled depth penetration weld to the third body portion 26 at the juncture of engagement of the first end 76 of the third body portion 26 and the second end 62 of the second body portion 24 to form a second sub-assembly. The controlled depth penetration weld permits accurate control of the depth of penetration of the weld. The final weld is held to the predetermined depth of penetration.

The second sub-assembly is fixtured and held at a predetermined axial position relative to a selected one of the plurality of annular "O" ring receiving grooves 40 disposed about the first body portion 22. The sealing surface 88 is machined externally in the third body portion 26 at a predetermined axial location between the first end and the dome end portion 78 of the third body portion 26. This axial position is important to the sealing of the combustion chamber from cooling fluid in passages 44.

INDUSTRIAL APPLICABILITY

With reference to the drawings, the pre-combustion chamber assembly 10 being made from three different materials (as set forth above) based on the operating environment (temperature and chemical) to which it is exposed maximizes the life of the pre-combustion chamber and reduces the cost of the assembly 10. It should be recognized that the temperature and chemical conditions in the pre-combustion chamber 94 of the third body portion 26, where combustion of fuel takes place, requires a different material than the second body portion 24 where fuel is disbursed by the fuel passing passageway 74 and the sparkplug 50 is held in position. The first body portion 22, which is exposed to the lowest temperatures requires the least exotic material. Brazing of the first and second body portions together and controlled depth penetration welding together of the second and third body portions makes possible the assembly of the three different materials.

The installation of the pre-combustion chamber assembly 10 in the cylinder head 14 is achieved by simply installing the "O" ring seals 42 in the annular grooves 40 and inserting the assembly 10 in the bore 12. During this insertion, the cylindrical second end portion 82 becomes disposed in the bore 92 with the sealing surface 88 of the third body portion 26 engaged with the sealing surface 20 of the cylinder head 14. The threaded fasteners 38 are screwthreadably connected to the cylinder head 14 and urge the pre-combustion chamber assembly 10 into the cylinder head and the sealing surfaces 88 and 20 into forcible sealing engagement with each other. The combustion chamber 18 is thus sealed from the cooling fluid disposed in cooling passages 44.

The "O" ring seals 42 seal the bore 12 of the cylinder head 14 relative to the pre-combustion chamber assembly and prevents cooling fluid flow in the passages 44 from leakage thereby. A study of the drawing of FIGS. 1 and 2 will reveal such details.

Other aspects, objects and advantages of this invention can be obtained from a study of the drawings, the disclosure and the appended claims.

We claim:

1. A pre-combustion chamber assembly for an internal combustion engine, comprising:

a first body portion having first and second spaced ends and a sparkplug receiving bore disposed therethrough and opening at said first and second ends, said sparkplug receiving bore being adapted to receive a sparkplug;

a second body portion having first and second spaced ends and a stepped bore disposed in and opening at the first and second ends of the second body portion, said stepped bore having a threaded bore portion, said threaded bore portion being adapted to screwthreadably receive a sparkplug;

a third body portion having a first end, a dome end portion spaced from said first end, and a pre-combustion chamber disposed in and opening at the first end of said third body, said dome end having a plurality of spaced apart orifices disposed therethrough and opening into said pre-combustion chamber;

said second end of the first body portion being connected to the first end of the second body portion by a brazing material and said second end of the second body portion being connected to the first end of the third body portion by a controlled depth penetration weld.

2. The pre-combustion chamber assembly, as set forth in claim 1, wherein the first, second and third body portions are each made from a different metallic material.

3. The pre-combustion chamber assembly, as set forth in claim 1, wherein said first body portion being made from a ductile iron material, said second body portion being made of a high temperature resistant stainless steel material and said third body portion being made of a high temperature resistant alloy material.

4. The pre-combustion chamber assembly, as set forth in claim 2, wherein said second body portion having a cylindrical first end portion at the first end thereof and said first body portion having a collar portion extending from the second end thereof, said collar portion receiving the first end portion of the second body portion and being radially spaced from the first end portion of the second body portion a preselected distance sufficient to receive the brazing material therebetween, said second end of the first body being engaged with the first end of the second body portion.

5. The pre-combustion chamber assembly, as set forth in claim 4, wherein said stepped bore having a counter-bore portion and a sealing surface defined by a step located between the counter-bore portion and the threaded bore portion, said counter-bore portion and said sparkplug receiving bore portion being axially aligned and having substantially a same diameter.

6. The pre-combustion chamber assembly, as set forth in claim 5, wherein said first body portion has a substantially cylindrical outer surface and a check valve receiving bore disposed therein, said check valve receiving bore being open at the first and second ends of the first body portion and being adapted to receive a check valve assembly therein, said check valve receiving bore and said sparkplug receiving bore being substantially parallel to each other and substantially parallel to a longitudinal central axis of the first body portion.

7. The pre-combustion chamber assembly, as set forth in claim 4, wherein said second body portion having a second end portion adjacent the second end thereof, said second end portion being cylindrical, and wherein said third body portion having a cylindrical first end portion adjacent the first end, said cylindrical first end portion of the third body portion and the cylindrical second end portion of the second body portion being axially aligned.

8. The pre-combustion chamber assembly, as set forth in claim 4, wherein said first end of the third body portion abutting the second end portion of the second body portion and including a sealing surface disposed about the third body portion at a location between the first end portion and the dome end.

9. A pre-combustion chamber assembly for an internal combustion engine, comprising:

a first body portion having first and second spaced ends and a sparkplug receiving bore disposed therethrough and opening at said first and second ends, said sparkplug receiving bore being adapted to receive a sparkplug therein;

a second body portion having first and second spaced ends and a stepped bore disposed in and opening at the first and second ends of the second body portion, said second body portion having a threaded bore portion disposed internally in said stepped bore, said threaded bore portion being adapted to screwthreadably receive a sparkplug;

a third body portion having a first end, a dome end portion spaced from said first end, and a pre-combustion chamber disposed in and opening at the first end of said third body, said dome end portion having a plurality of spaced apart orifices disposed therethrough and opening into said pre-combustion chamber;

said first, second and third body portions each being of a different metallic material, said second end of the first body portion being connected to the first end of the second body portion and said second end of the second body portion being connected to the first end of the third body portion.

10. A pre-combustion chamber assembly, as set forth in claim 9, wherein said first body portion being made of a ductile iron material, said second body portion being made of a stainless steel material, and the third body portion being made of a high temperature alloy material.

11. A pre-combustion chamber assembly, as set forth in claim 10, wherein said second end of the first body portion being connected to the first end of the second body portion by a brazing material and said second end of the second body portion being connected to the first end of the third body portion by a controlled depth penetration weld.

12. The pre-combustion chamber assembly, as set forth in claim 11, wherein said second body portion having a cylindrical first end portion at the first end thereof and said first body portion having a collar portion extending from the second end thereof, said collar portion receiving the first end portion of the second body portion and being radially spaced from the second end portion of the second body portion a preselected distance sufficient to receive the brazing material therebetween, said second end of the first body being engaged with the first end of the second body.

13. The pre-combustion chamber assembly, as set forth in claim 12, wherein said stepped bore having a counter-bore portion and a sealing surface defined by a step located between the counter-bore portion and the threaded bore portion, said counter-bore portion and said sparkplug receiving bore portion being axially aligned and having substantially a same diameter.

14. The pre-combustion chamber assembly, as set forth in claim 13, wherein said first body portion has a substantially cylindrical outer surface and a check valve receiving bore disposed therein, said check valve receiving bore being open at the first and second ends of the first body portion and being adapted to receive a check valve assembly therein, said check valve receiving bore and said sparkplug receiving bore being substantially parallel to each other and substantially parallel to a longitudinal central axis of the first body portion.

15. The pre-combustion chamber assembly, as set forth in claim 14, wherein said second body portion having a second end portion adjacent the second end thereof, said second end portion having a cylindrical outer surface, and wherein said third body portion having a first end portion adjacent the first end, said first end portion having a cylindrical outer surface, said cylindrical outer surface of the first end portion of the third body portion and the cylindrical outer surface of the second end portion of the second body portion being axially aligned.

16. The pre-combustion chamber assembly, as set forth in claim 15, wherein said first end of the third body portion abutting the second end portion of the second body portion and including an axial sealing surface disposed about the third body portion at a location between the first end portion and the dome end.

17. A method of manufacturing a pre-combustion chamber assembly having first, second and third body portions of different metallic materials, comprising the steps of:

machining a sparkplug receiving bore, a second end, a collar portion, and an outer cylindrical surface of the first body portion to finished dimensions;

machining a first end, a second end, a cylindrical first end portion and a stepped bore having a threaded bore portion of a second body portion to finished dimensions;

machining a first end, a combustion chamber and plurality of spaced apart orifices in a dome end portion of a combustion chamber to finished dimensions;

maintaining the second end of the first body and the first end of the second body in abutment with each other and the sparkplug receiving bore and the stepped bore in substantially axial alignment with each other; and brazing the first and second body portions together to form a first sub-assembly.

18. The method, as set forth in claim 17, wherein said first body portion has a flange at the first end portion and including the steps of:

maintaining the second end of the second body portion of the first sub-assembly in engagement with the first end of the third body portion and with the orifices of the third body portion oriented in a preselected direction relative to the flange of the first body portion; and welding the second body portion to the third body portion at a juncture of engagement of the first and second ends of the third and second body portions, respectively, to a predetermined depth of penetration and forming a second sub-assembly.

19. A method, as set forth in claim 18, comprising the steps of:

holding the second sub-assembly at a predetermined axial position relative to an annular "O" ring receiving groove disposed about the first body portion; and machining a sealing surface externally in the third body portion at a predetermined axial location between the first end and the dome end portion of the third body portion.

20. The method, as set forth in claim 18, including the step of providing a collar portion to extend in an axial direction from the second end of the first body portion, said collar portion receiving the first end portion of the second body portion and being radially spaced from the first end portion of the second body portion a preselected distance sufficient to receive the brazing material therebetween.

* * * * *